No. 758,384. PATENTED APR. 26, 1904.
F. J. REICHERT.
METHOD OF PREPARING EXTRACT OF COFFEE.
APPLICATION FILED MAY 24, 1902.
NO MODEL.
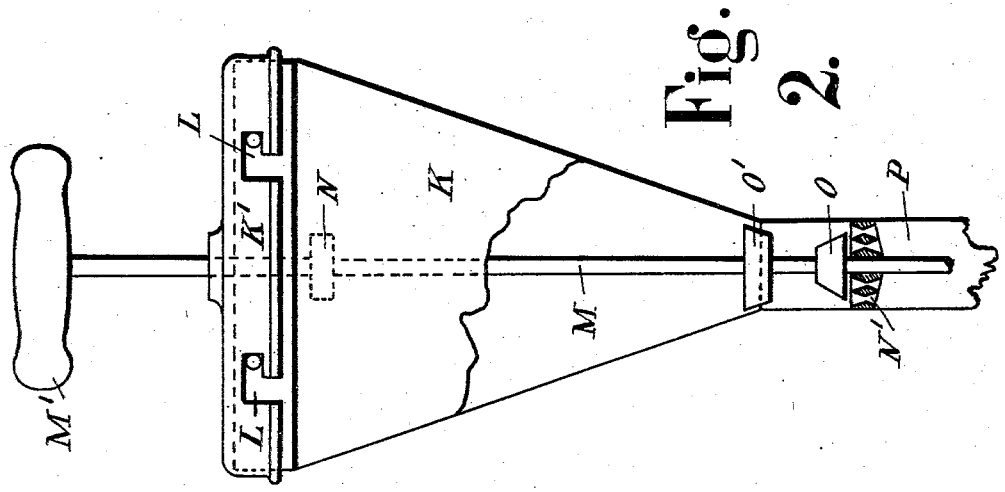
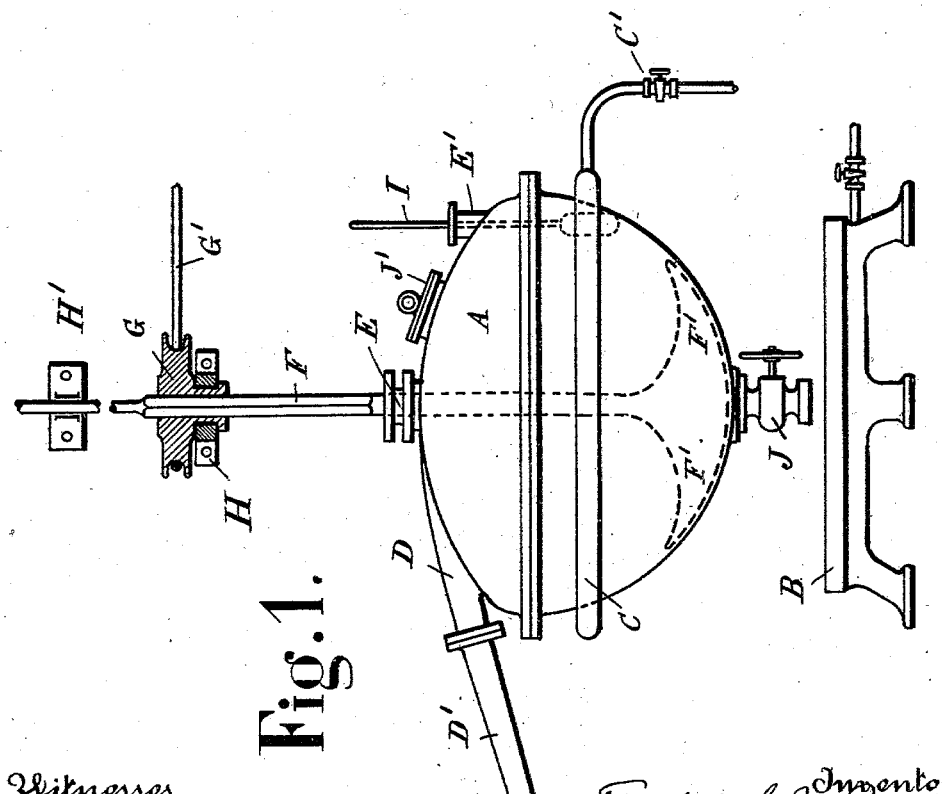

No. 758,384. Patented April 26, 1904.

UNITED STATES PATENT OFFICE.

FREDERICK JOHN REICHERT, OF HORNSEY, ENGLAND.

METHOD OF PREPARING EXTRACT OF COFFEE.

SPECIFICATION forming part of Letters Patent No. 758,384, dated April 26, 1904.

Application filed May 24, 1902. Serial No. 108,839. (No specimens.)

*To all whom it may concern:*

Be it known that I, FREDERICK JOHN REICHERT, a subject of the King of Great Britain, and a resident of Hornsey, in the county of Middlesex, England, have invented a Method of Preparing Extract of Coffee, of which the following is a specification.

My invention relates to a new or improved method of extracting from coffee-berries substances soluble in hot water, together with the aroma of the coffee, and preparing the same in the form of a dry extract, and also to apparatus therefor by which certain advantages are obtained.

In carrying my invention into effect I subject the raw coffee-berries to a slow and uniform heating in a revolving roaster, with access of air, until the berries begin to acquire a light-brown color. The heating is then stopped at this point. By this means the loss of aroma is avoided, and certain albumenoid substances allied to vegetable casein which exist in soluble form in the raw berries are coagulated in an insoluble form, the hygroscopic moisture is expelled, and the berries are suitably conditioned for grinding. The tannin and allied substances are also less easily decomposed in the subsequent processes when the berries are heated as described than with fully-roasted berries, and the natural flavor of the coffee is more completely preserved. The loss in weight during the heating is about twelve per cent. After cooling, the berries are ground in the ordinary manner to a uniform powder. I then prepare a liquid extract in the following manner: The powdered coffee may be conveniently exhausted with successive portions of water boiled under steam-pressure sufficient to maintain the boiling-temperature at about 220° Fahrenheit, allowing about ten minutes for each exhaustion at that temperature, or the exhaustion may be carried out with successive portions of boiling water, each acting for about fifteen minutes, in a still at atmospheric pressure and a temperature of about 212° Fahrenheit; but in this case there will be distillates, which must be collected and the coffee aroma recovered therefrom by agitation with methylated chloroform or other suitable vehicle. The concentrated liquid extract obtained by either of the above-mentioned processes is then transferred to a suitable vessel and allowed to settle, which may require up to twelve hours or more. The clear liquid is now decanted from the sediment. The upper portion of the clear liquid is of a lighter color than the remainder and may be rejected with a view to an improvement in the appearance of the beverage produced from the final dry product, or it may preferably be retained in order to preserve more of the aroma. After decantation the liquid extract is evaporated in a vacuum-still until it acquires a syrupy consistence, but remains sufficiently mobile to allow of ready transference to the roasting apparatus. All distillates given off during this evaporation should be collected and the aroma obtained from them by chloroform, as before. The liquid extract is now dried and roasted. A convenient form of apparatus for effecting this is shown diagrammatically in Figure 1. It consists of a still A, preferably of enameled copper, heated by an annular Bunsen burner B and surrounded by a pipe C, bent into a circular form and connected to a water-supply through the cock C'. This circular water-pipe is perforated with a number of openings, so that when the cock C' is opened the water issues in jets from the ring and impinging on the retort A rapidly cools it. The head of the retort is provided with an opening D, through which the products of distillation pass by the pipe D' to any convenient form of condenser. In the center of the head is a stuffing-box E, through which passes the shaft F. The bottom of this shaft carries one or more blades F' F', which act as stirrers when the shaft is rotated by any suitable means, such as a pulley G and band G'. That part of the shaft F which extends through the pulley to the stuffing-box is square and passes freely through a square hole in the pulley G, so that even while the shaft is rotating it can be lowered to the position shown or raised, so as to lift the blades F' F' of the stirrer into the head of the still. The under part of the pulley G projects through the bearing H and is provided with a flange, so that vertical movement of the pulley is prevented when the shaft is being raised or lowered through it. It is convenient to provide another bearing, H', in order to steady the shaft and prevent undue pressure on the stuffing-box E. The still is provided with a stuffing-box E', through which passes a thermometer I, which dips into the material under treatment in the still, so that its temperature may be ascertained. In the bottom of the still is an opening, which normally is closed by a valve J. An opening is provided on the head of the still for introducing the material to be treated, and this is normally closed by a cover J'. The Bunsen burner B is preferably not fixed in position, but so arranged that it may be rapidly removed from under the still when the heating is completed.

In order to dry and roast the concentrated liquid extract prepared as described above, it is introduced into the still through the opening in the head and heat then applied. The remaining moisture is thus expelled and the extract gradually converted into a solid. The temperature during this operation may rise to 250° or even to 280° Fahrenheit before the extract becomes quite dry. The distillates obtained during the evaporation are collected and treated with chloroform, as before. The chloroform may now be separated from all the distillates collected up to this point and slowly evaporated in a still until about one per cent. remains, containing the aroma recovered. This portion may be added to the dried extract and the heating then continued and increased to a roasting temperature. The stirrer is now set in motion, so that the blades F' F' in revolving break and thoroughly mix the extract and prevent its being burned. From this point onward roasting is continued, and at about 300° Fahrenheit the solid begins to fuse and froth up. The temperature in roasting may be raised to 350° or even 382° Fahrenheit, according to the product required. The flavor of the finished extract may be varied from that resembling under-roasted coffee to that of highly-roasted coffee by suitable choice of temperature. The extract should be constantly stirred during the final roasting to avoid burning and the formation of insoluble matter. The distillates should be again collected as they contain a large proportion of aroma and caffeine. As these tend to condense in the still-head and in the pipe D', near thereto, these parts of the still should be so constructed that they may be readily washed with methylated chloroform—as, for example, by making the pipe D' detachable from the condenser and still and the still-head detachable from the body or lower portion. The aroma and caffeine may be recovered from the chloroform, as hereinbefore described, and may be added to the cooled roasted extract and the whole powdered and mixed without undue exposure to air. This is effected by conducting the operations of powdering and mixing in the still itself in the manner to be now described. When the roasting has been carried to the extent necessary to produce the flavor required, the blades F' F' are raised into the head of the still, the Bunsen burner B is quickly withdrawn, so as no longer to heat the still, and the cock C' is opened, so as to very rapidly cool the still by the water-sprays thus produced. If the cooling be rapidly done when the roasting is completed, the coffee extract produced solidifies in a dry porous state, which is very easily pulverized. The pulverizing is performed by lowering the blades F' F' while in rapid rotation, thus breaking up the dry porous mass in the still. The pulverized extract may now be removed from the still through the opening and valve J.

For filling the finished product into bottles or like receptacles I use hoppers which are approximately air-tight, provided with an outlet adapted to fit the receptacles which are to be filled with extract and also provided with a reciprocating, rotating, or shaking device for breaking up lumps and assisting the passage of the extract from the hopper to the receptacle. The still and hopper are arranged so that the hopper may be readily attached to the outlet from the still with a nearly air-tight joint, or the receptacles may be filled directly from the still. A convenient form of hopper for this purpose is shown in Fig. 2. The body K is of conical form; but the upper portion is cylindrical and of such dimensions as to fit tightly onto the lower end of the valve J. The hopper is provided with a cover K', fixed to it in any convenient manner—as, for example, by bayonet-joints L L. Through the cover K' slides a rod M, having a handle M' screwed onto it and provided with a stop N, which prevents the rod being lifted too high. The lower part of the rod slides in a guide-hole in the center of the perforated plate N' and has fixed to it two disks O and O'. The disk O' closes the lower end of the conical body K when the rod M is pushed down, and when in this position the disk O is close to the perforated plate N'. The apparatus is used in the following manner: The handle M' being unscrewed from the rod M, the cover K' is removed from the hopper. The upper cylindrical part of the hopper is then fitted onto the lower part of the valve J, Fig. 1, and the valve opened. The dry and powdered coffee extract is allowed to fall into the hopper until this is full, being assisted to pass through the valve J, if necessary, by rotating the stirrer. The valve J being now closed, the hopper is removed and the cover E' and handle M' replaced. The lower part of the hopper is now introduced into the neck of the bottle or other receptacle into which the coffee extract is to be filled. It is desirable that these should fit tightly one in the other, so that the coffee extract is not unduly exposed to the air during the operation of filling. In order to fill the receptacle, the rod M is moved up and down by means of the handle M', thus raising and lowering the disks O and O'. Each time the disk O' is raised some of the extract contained in the hopper passes into the lower cylindrical portion and if fine enough falls through the perforations of the plate N' into the receptacle. Any lumps which may be in the hopper are broken by being crushed between the disk O' and the conical sides of the hopper. If still too large to pass through the perforations in N', these lumps are broken up and forced through by the disk O.

In order to preserve the fine crystalline appearance of the extract when required for use in tropical climates, from one-half to five per cent. of saccharate of lime may be added, though usually this is not necessary.

Having thus described my invention, what I claim as new, and desire to secure by Letters Patent, is—

1. The herein-described method of preparing coffee extract which consists in heating the coffee-berries to a light-brown color, in which the aroma is retained and certain substances of the berries are rendered insoluble, then grinding the berries and exhausting the same with water to form a liquid extract and evaporating the liquid extract to a consistency suitable for roasting, and finally drying and then roasting the evaporated extract, substantially as set forth.

2. The herein-described method of preparing coffee extract which consists in heating the coffee-berries to a light-brown color, in which the aroma is retained and certain substances of the berries are rendered insoluble, then grinding the berries and successively exhausting the same with boiling water, then decanting and evaporating the liquid extract to a consistency suitable for roasting, then drying the evaporated liquid extract and finally roasting the same, substantially as set forth.

3. The herein-described method of preparing coffee extract which consists in heating the coffee-berries to a light-brown color, in which the aroma is retained and certain substances of the berries are rendered insoluble, then grinding the berries and exhausting the same with water, collecting the distillates therefrom and treating the same with methylated chloroform, and returning the same to said extract, evaporating the liquid extract and driving off the methylated chloroform therefrom and finally drying and roasting the extract, substantially as set forth.

4. The herein-described method of preparing coffee extract which consists in making a liquid extract from ground, dried, coffee, heated to a light-brown color, then evaporating such liquid extract to dryness and then roasting the same, substantially as set forth.

In witness whereof I have hereunto set my hand in presence of two witnesses.

FREDERICK JOHN REICHERT.

Witnesses:
T. J. OSMAN,
W. M. HARRIS.